United States Patent
Terazawa et al.

[11] Patent Number: 5,897,175
[45] Date of Patent: Apr. 27, 1999

[54] BRAKE PRESSURE CONTROL SYSTEM FOR A VEHICLE

[76] Inventors: Tadashi Terazawa, 81, Urahata, Nishioka-cho; Michiharu Nishii, 4-76, Konezaki, Nakane-cho, both of Toyota city, Aichi pref., Japan

[21] Appl. No.: 08/680,237

[22] Filed: Jul. 11, 1996

[30] Foreign Application Priority Data

Jul. 20, 1995 [JP] Japan .................................. 7-183731

[51] Int. Cl.⁶ ..................................................... B60T 8/34
[52] U.S. Cl. ........................................ 303/113.4; 303/155
[58] Field of Search ................................. 303/155, 113.4, 303/114.1, 117.1, 116.1, 116.2, DIG. 1–2

[56] References Cited

U.S. PATENT DOCUMENTS

| | | | |
|---|---|---|---|
| 5,158,343 | 10/1992 | Reichelt et al. | 303/113.4 |
| 5,350,224 | 9/1994 | Nell et al. | 303/113.4 X |
| 5,367,942 | 11/1994 | Nell et al. | 303/113.4 X |
| 5,375,917 | 12/1994 | Inagaki et al. | 303/113.4 X |
| 5,515,678 | 5/1996 | Kurokawa et al. | 60/591 |
| 5,535,123 | 7/1996 | Rump et al. | 303/155 X |

FOREIGN PATENT DOCUMENTS

| | | | |
|---|---|---|---|
| 4112134 | 12/1992 | Germany | 303/113.4 |
| 3-227766 | 10/1991 | Japan . | |

*Primary Examiner*—Peter M. Poon

[57] ABSTRACT

The invention is directed to a brake pressure control system which includes a brake pedal, a wheel brake operatively mounted on a wheel, and a pressure generator which generates a first brake pressure of a first pressure characteristic according to a stroke of the brake pedal, and which generates a second brake pressure of a second pressure characteristic according to the stroke of the brake pedal. The pressure generator is adapted to generate the second brake pressure to be higher than the first brake pressure, with a smaller stroke of the brake pedal than the stroke of the brake pedal for generating the first brake pressure. The system further includes a detector for detecting an emergency brake operation of the brake pedal, and a pressure selecting device which selects one of the first brake pressure and the second brake pressure to be supplied into the wheel brake. The pressure selecting device is adapted to select the second brake pressure when the detector detects the emergency brake operation of the brake pedal.

6 Claims, 4 Drawing Sheets

BRAKE PRESSURE CONTROL SYSTEM FOR A VEHICLE

BACKGROUND OF THE INVENTION

1. Field of the Invention

The present invention relates to a brake pressure control system for a vehicle, and more particularly to the system having a pressure generating device for generating a first pressure and a second pressure having different pressure characteristics.

2. Description of the Related Arts

A brake pressure control system as disclosed in a Japanese Patent Laid-open Publication No. 3-227766 is adapted to increase a brake force applied to a wheel of a vehicle according to a brake operating force applied by a driver, when an emergency brake operation by the driver is detected. According to the brake pressure control system disclosed in the publication, when the emergency brake operation is detected, an electromagnetic valve connected to a variable chamber of a vacuum booster is placed in its open position for introducing a large volume of atmospheric air into the variable chamber thereby to increase the brake force. As a result, a stopping distance is shortened in case of the emergency brake operation, comparing with that in case of an ordinary brake operation. In the brake pressure control system as described above, however, it is necessary to provide the electromagnetic valve connected to the variable chamber, so that a large modification in structure to the vacuum booster is required, which causes increase in cost.

SUMMARY OF THE INVENTION

Accordingly, it is an object of the present invention to provide a brake pressure control system for a vehicle, which is adapted to increase a brake force in response to an emergency brake operation, with as small modification in structure made to the prior brake system as possible.

In accomplishing the above and other objects, a brake pressure control system for a vehicle includes a brake pedal, a wheel brake operatively mounted on a wheel, a pressure generator which generates a first brake pressure of a first pressure characteristic according to a stroke of the brake pedal, and generates a second brake pressure of a second pressure characteristic according to the stroke of the brake pedal, wherein the pressure generator is adapted to generate the second brake pressure to be higher than the first brake pressure, with a smaller stroke of the brake pedal than the stroke of the brake pedal for generating the first brake pressure. The system further includes a detector for detecting an emergency brake operation of the brake pedal, and a pressure selecting device which selects one of the first brake pressure and the second brake pressure to be supplied into the wheel brake. The pressure selecting device is adapted to select the second brake pressure when the detector detects the emergency brake operation of the brake pedal.

In the above-described system, the pressure generator may include a cylinder body, a pressure source which is connected with the cylinder body for generating a power brake pressure, a piston which is slidably disposed in the cylinder body and operated by the brake pedal, a regulator valve which is disposed in the cylinder body, and which is operatively connected with the piston for defining a first pressure chamber and a second pressure chamber in the cylinder body. The first pressure chamber is adapted to generate the first brake pressure in response to depression of the brake pedal, and the second pressure chamber is adapted to introduce thereinto the power brake pressure generated from the pressure source, and regulate the power brake pressure in response to depression of the brake pedal to generate the second brake pressure.

Preferably, the pressure selecting device includes a changeover valve which is selectively placed in one of a first position for communicating the wheel brake with the first pressure chamber and blocking a communication between the wheel brake and the second pressure chamber, and a second position for communicating the wheel brake with the second pressure chamber and blocking the communication between the wheel brake and the first pressure chamber.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
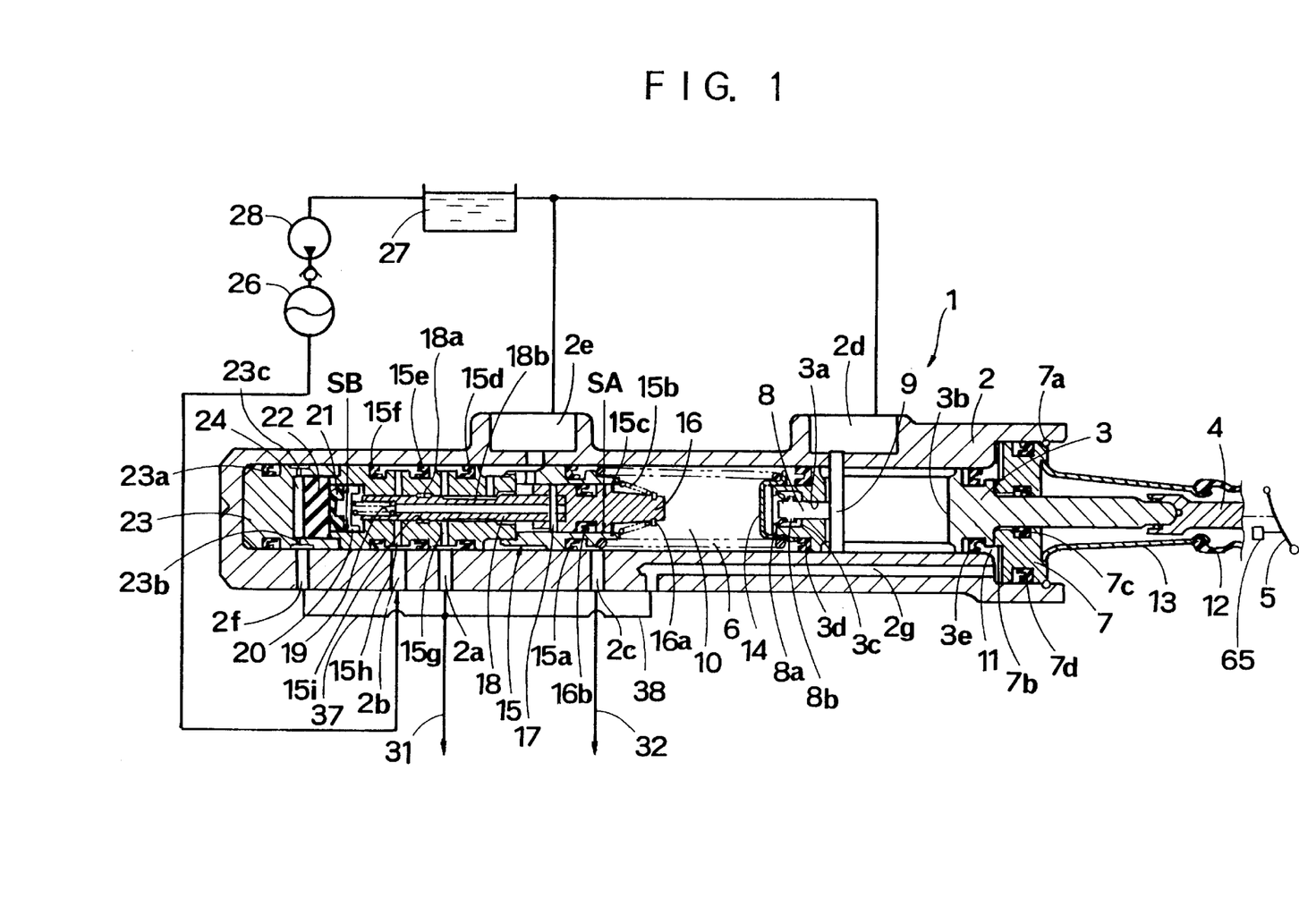
FIG. 1 is a sectional view of a pressure generating device for use in a brake pressure control system for a vehicle according to an embodiment of the present invention.
Figure 2:
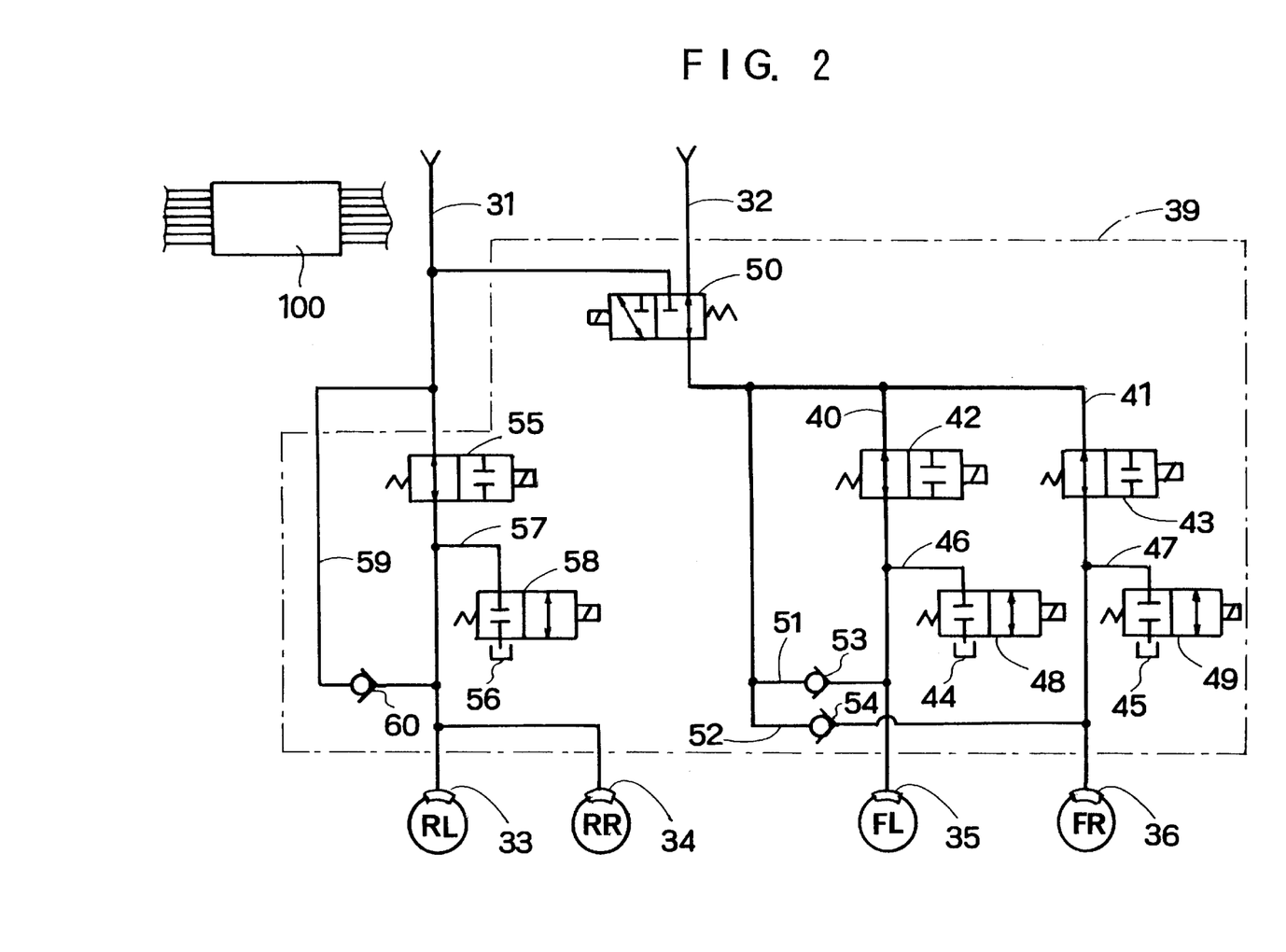
FIG. 2 is a schematic view of an arrangement of valves and wheel brakes connected to the pressure generating device as shown in FIG. 1.

Referring to FIGS. 1 and 2, there is schematically illustrated a brake pressure control system for a vehicle having a brake pressure generating device 1, which includes a cylinder body 2 and a first piston 3 slidably disposed in the cylinder body 2 as shown in FIG. 1, and a plurality of valves connected to the pressure generating device 1 through main passages 31, 32 as shown in FIG. 2. The first piston 3 is connected with a brake pedal 5 through a push rod 4. A stroke sensor 65 is connected to the brake pedal 5 so as to detect a stroke of the brake pedal 5. The first piston 3 is biassed by a return spring 6 so that the first piston 3 is in contact with a plate member 7 which is prevented from moving in the rightward direction by a snap ring 7a. A stopper 7b is disposed at the left side of the plate member 7 as shown in FIG. 1 for limiting leftward movement of the plate member 7.

The first piston 3 includes a connecting passage 3a into which an inlet valve 8 is inserted. The inlet valve 8 is biassed by a spring 8a, and is in contact with a pin 9 which is fixed to the cylinder body 2. The pin 9 is also inserted into a through hole 3b of the first piston 3. In the condition where the first piston 3 is not activated to be placed as shown in FIG. 1, a valve portion 8b of the inlet valve 8 is not in contact with a valve seat 3c provided on the first piston 3. Two seal cups 3d, 3e are mounted on the left and right portions respectively of the first piston 3. The plate member 7 includes an inner seal cup 7c and an outer seal cup 7d. With the above seal cups 3d, 3e, 7c and 7d, a pressure chamber 10 is formed at the left side of the first piston 3 and an auxiliary pressure chamber 11 is formed between the right side of the first piston 3 and the plate member 7. A boot 12 is provided to separate the inside of the pressure generating device 1 from the outside of the device 1. A retainer 13 is connected with the boot 12 to support the boot 12 and to prevent the push rod 4 from radially inclining. Further, a cup retainer 14 engages the first piston 3 so as to mount the return spring 6 on the first piston 3, and to prevent the seal cup 3d from being disengaged from the first piston 3.

A sleeve member 15 is forced by the return spring 6 so as to be in contact with a left end portion of the cylinder body 2. The sleeve member 15 includes a seal cup 15a which defines the other end of the pressure chamber 10. A second piston 16 is slidably disposed in the sleeve member 15. The second piston 16 is biassed in the rightward direction relative to the sleeve member 15 by a piston spring 15b so as to be in contact with a stopper 15c. The piston spring 15b is also engaged with a snap ring 16a disposed on the second piston 16. The second piston 16 includes a seal cup 16b for defining the pressure chamber 10 and for receiving the pressure in the pressure chamber 10 so as to be moved in the leftward direction in FIG. 1. The second piston 16 is connected with a spool valve 18 through a pin 17 so that the spool valve 18 is moved integrally with the second piston 16.

A piston return member 20 is connected with the left end of the spool valve 18 through a spring 19. A reaction member 21 which possesses a trapezoidal shaped configuration is mounted on the piston return member 20 so as to serve as restriction means. The reaction member 21 is biassed by the spring 19 into contacting engagement with an elastic member 22 (made of rubber or the like) which also serves as a part of the restriction means. In the illustrated embodiment, the short side of the trapezoidal configuration of the reaction member contacts the elastic member 22. A retainer 23 is fixed to the sleeve member 15 so as to prevent the sleeve member 15 from moving. The retainer 23 includes a seal cup 23a and passages 23b, 23c. The elastic member 22 forms a regulated pressure chamber 24 with the retainer 23.

The sleeve member 15 further includes seal cups 15d, 15e and 15f which are arranged in succession from the right to left. An outlet port 15g is disposed between the seal cups 15d, 15e for connection to a main passage 31 connecting to wheel brakes 33, 34 operatively mounted on a rear left wheel RL and a rear right wheel RR of the vehicle. Further, an inlet port 15h is disposed between the seal cups 15e, 15f into which is introduced a brake fluid charged in an accumulator 26. The brake fluid is stored in a reservoir tank 27 and is pressurized by a fluid pump 28 so as to be charged into the accumulator 26. The outlet port 15g and the inlet port 15h are respectively connected with a regulator port 2a and an inlet port 2b formed in the cylinder body 2. The cylinder body 2 includes a port 2c connected to a main passage 32 connecting to wheel brakes 35, 36 operatively mounted on a front left wheel FL and a front right wheel FR. Further, the cylinder body 2 includes inlet ports 2d, 2e both of which are connected to the reservoir tank 27. The spool valve 18 includes a first groove 18a and a second groove 18b. The sleeve member 15 also includes a groove 15i. The regulator port 2a is connected to a port 2f which is connected to the regulated pressure chamber 24, through a passage 37. The regulator port 2a is further connected to the auxiliary pressure chamber 11 through a passage 2g and a feedback passage 38.

As shown in FIG. 2, a pressure control device 39 is disposed between the pressure generating device 1 and the wheel brakes 33, 34, 35 and 36. The wheel brakes 35, 36 are connected to the main passage 32 through pressure increasing passages 40, 41, respectively, in which pressure increasing valves 42, 43 are disposed. Each of the pressure increasing valves 42, 43 is a normally open electromagnetic valve which is activated by a control circuit 100. Atmospheric pressure reservoirs 44, 45 are connected to positions between the pressure increasing valves 42, 43 and the wheel brakes 35, 36 through relief passages 46, 47, respectively, on which pressure decreasing valves 48, 49 are disposed. Each of the pressure decreasing valves 48, 49 is a normally closed electromagnetic valve which is activated by the control circuit 100. A changeover valve 50 of an electromagnetic valve having three ports is disposed on the main passage 32 between the pressure increasing valves 42, 43 and the port 2c, and is activated by the control circuit 100. The changeover valve 50 is selectively placed in one of a first position in its inoperative condition for communicating the pressure increasing valves 42, 43 with the port 2c connected to the pressure chamber 10 and blocking the communication between the pressure increasing valves 42, 43 and the regulator port 2a, and a second position in its operative condition for communicating the pressure increasing valves 42, 43 with the regulator port 2a and blocking the communication between the pressure increasing valves 42, 43 and the port 2c. Return passages 51, 52 are disposed to communicate positions on the pressure increasing passages 40, 41 between the pressure increasing valves 42, 43 and the wheel brakes 35, 36 with a position between the pressure increasing valves 42, 43 and the changeover valve 50, respectively. Check valves 53, 54 are disposed on the return passages 51, 52, respectively, so as to allow the flow of the brake fluid from the wheel brakes 35, 36 to the pressure generating device 1, and block the reverse flow from the pressure generating device 1 to the wheel brakes 35, 36.

A pressure increasing valve 55 of a normally open electromagnetic valve is disposed on the main passage 31 and is controlled by the control circuit 100. An atmospheric pressure reservoir 56 is connected to the main passage 31 between the pressure increasing valve 55 and the wheel brakes 35, 36 through a relief passage 57, on which is disposed a pressure decreasing valve 58 of a normally closed electromagnetic valve controlled by the control circuit 100. A return passage 59 is disposed to communicate a position between the pressure increasing valve 55 and the wheel brakes 33, 34 with a position between the pressure increasing valve 55 and the regulator port 2a of the pressure generating device 1. A check valve 60 is disposed on the return passage 59 so as to allow the flow of the brake fluid from the wheel brakes 33, 34 to the pressure generating device 1, and block the reverse flow from the pressure generating device 1 to the wheel brakes 33, 34.

The operation of the pressure generating device 1 will be described hereinafter. When the brake pedal 5 is operated, the first piston 3 is moved in the leftward direction in FIG. 1 through the push rod 4. Therefore, the inlet valve 8 is separated from the pin 9, so that the valve portion 8b contacts the valve seat 3c by means of the biasing force of the spring 8a thereby to separate the pressure chamber 10 from the reservoir tank 27. Then, a brake pressure PM is generated in the pressure chamber 10 with the stroke of the piston 3 increased to reduce the volume in the pressure chamber 10.

At this time, the second piston 16 receives a force PM×SA (SA: cross-sectional area of the second piston 16) thereby to be moved in the leftward direction in FIG. 1 since the second piston 16 receives the brake pressure PM in the pressure chamber 10. The spool valve 18 is moved integrally with the second piston 16 in the leftward direction because the spool valve 18 is fixed to the second piston 16 by the pin 17. Therefore, the spool valve 18 compresses the spring 19 to be in contacting engagement with the piston return member 20. The first groove 18a of the spool valve 18 communicates with the inlet port 15h of the sleeve member 15 as a result of the movement of the spool valve 18, thereby to communicate the inlet port 15h with the groove 15i of the sleeve member 15 through the first groove 18a. On the other hand, the second groove 18b is communicated with the groove 15i to communicate the groove 15i with the outlet port 15g through the second groove 18b. Therefore, the inlet port 15h is communicated with the outlet port 15g by the leftward movement of the spool valve 18 in FIG. 1. Consequently, the brake pressure in the accumulator 26 is introduced into the regulated pressure chamber 24 from the regulator port 2a through the port 2f because the inlet port 2b is communicated with the regulator port 2a through the inlet port 15h, the first groove 18a, the groove 15i, the second groove 18b and the outlet port 15g.

The pressure in the regulated pressure chamber 24 forces the elastic member 22 to move the spool valve 18 in the rightward direction through the reaction member 21 and the piston return member 20 against the brake pressure PM in the pressure chamber 10. The spool valve 18 is balanced when the pressure forces which the spool valve 18 receives from the pressure chamber 10 and the regulated pressure chamber 24 are equal. In this case, when the area of the elastic member 22 in contact with the reaction member 21 is represented by SV, a relation between the pressure PM in the pressure chamber 10 and a regulated pressure PR introduced into the regulated pressure chamber 24 from the accumulator 26 through the spool valve 18 is represented by the following formulation (the losses by the load of the return spring 6 or the like are omitted):

$$PM \times SA = PR \times SV$$

Therefore, the regulated pressure PR introduced into the regulated pressure chamber 24 is represented by the following formulation:

$$PR = PM \times SA / SV$$

Figure 3:
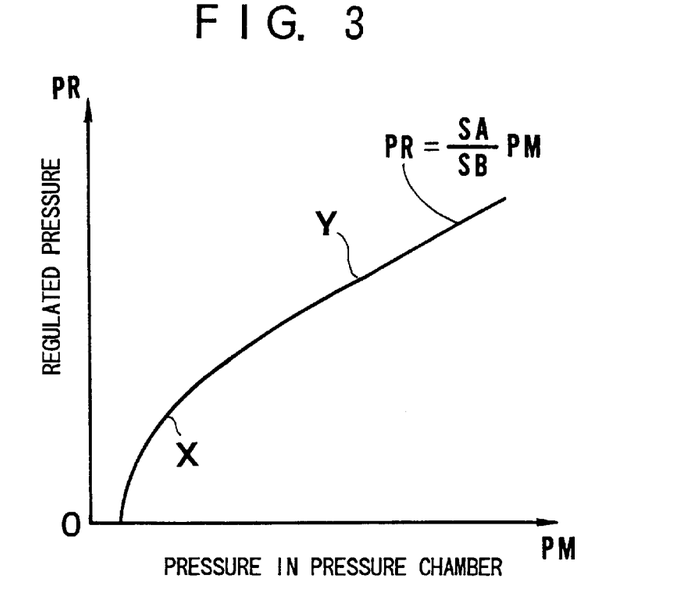
FIG. 3 is a graph showing a relationship between a pressure in a pressure chamber and a regulated pressure according to an embodiment of the present invention.

When the regulated pressure PR in the regulated pressure chamber 24 is not very large, the area SV of the elastic member 22 in contact with the reaction member 21 is not very large, because the elastic member 22 is not strongly forced toward the reaction member 21. However, the area SV of the elastic member 22 becomes larger according to the increase of the regulated pressure PR until the area SV becomes a maximum value SB in FIG. 1. Therefore, the characteristic of the relationship between the brake pressure PM in the pressure chamber 10 and the regulated pressure PR in the regulated pressure chamber 24 is represented by a gradual or relatively smooth and gently curving characteristic curve X as shown in FIG. 3. This characteristic can be variously altered or changed by changing the consistency of the elastic member 22 or by changing the shape of the portion of the reaction member 21 in contact with the elastic member 22, in contrast with such a prior art that the pressure in the regulated pressure chamber is increased linearly according to the increase of the pressure in the pressure chamber.

When the area of the reaction member 21 in contact with the elastic member 22 becomes the maximum value SB, the regulated pressure PR is represented by the following formulation thereby to form Y-section in FIG. 3:

$$PR = PM \times SA / SB$$

From that point on, the regulated pressure PR increases linearly according to the increase of the brake pressure PM in the pressure chamber 10 because the values SA, SB are constant (See Y-section in FIG. 3). The characteristic of the relation between the regulated pressure PR and the brake pressure PM (represented by the gradient of the Y-section of FIG. 3) is varied by variations in the sectional area SA of the second piston 16 and the sectional area SB of the reaction member 21. Therefore, the characteristic of the brake pressure PM in the pressure chamber 10 relative to a brake pedal operating force can be varied.

Figure 4:
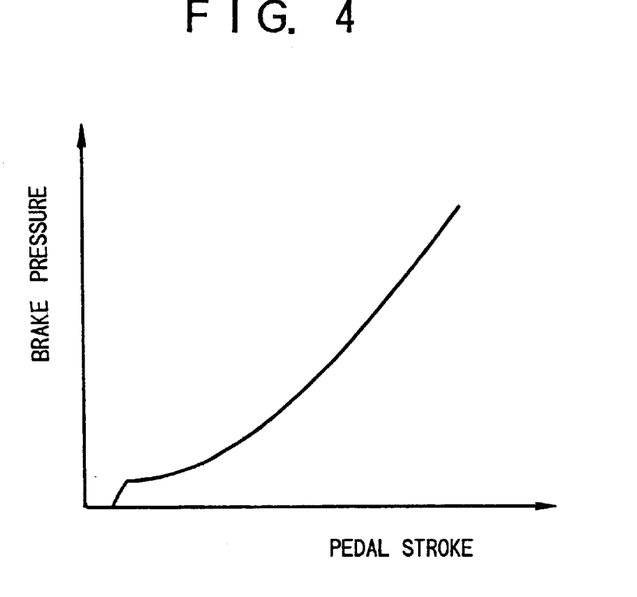
FIG. 4 is a graph showing a relationship between a front brake pressure and a stroke of a brake pedal in case of an ordinary brake operation according to an embodiment of the present invention.

The regulated pressure PR introduced into the regulated pressure chamber 24 from the accumulator 26 through the spool valve 18 is transmitted to the auxiliary pressure chamber 11 through the passage 2g thereby to boost up the operation of the first piston 3, and is transmitted to the wheel brakes 33, 34 mounted on the rear wheels RR, RL through the pressure increasing valve 55. The brake pressure PM in the pressure chamber 10 is supplied to the wheel brakes 35, 36 mounted on the front wheels FR, FL, through the valves 50, 42 and 43. The relationship between the stroke of the brake pedal 5 and the brake pressure in the front wheel brakes 35, 36 shows a relatively gradual increase of the pressure according to the stroke, as shown in FIG. 4.

In the case where the brake pedal 5 is depressed to apply the brake force to the wheels when the vehicle is running on a road of a low coefficient of friction, such as a snow road or an icy road, and a locking of a front wheel is detected by the control circuit 100 on the basis of the wheel speeds detected by wheel speed sensors (not shown), then the changeover valve 50 is activated to be placed in its second position. As a result, the communication between the pressure increasing valves 42, 43 and the port 2c which is connected to the pressure chamber 10, is blocked, and in turn the pressure increasing valves 42, 43 are communicated with the regulator port 2a of the pressure generating device 1, so that the regulated pressure PR regulated by the spool valve 18 is introduced into the pressure increasing valves 42, 43 in stead of the pressure PM in the pressure chamber 10. At this time, if a locking of the front left wheel FL is detected,for example, the pressure increasing valve 42 is activated to be placed in its closed position, so that the wheel brake 35 is shut off from the pressure generating device 1. Also, the pressure decreasing valve 48 is activated to be placed in its open position, so that the wheel brake 35 is communicated with the reservoir 44 through the relief passage 46. Therefore, the brake fluid in the wheel brake 35 is drained to the reservoir 44 thereby to reduce the pressure in the wheel brake 35. Thus, an anti-locking operation is performed. When the control circuit 100 detects that the pressure in the wheel brake 35 is reduced to release the wheel from locking, the pressure increasing valve 42 and the pressure decreasing valve 48 are returned to their inoperative conditions, the regulated pressure PR is supplied from the pressure generating device 1 to the wheel brake 35 through the changeover valve 50 and the pressure increasing valve 42.

When the locking of the front right wheel FR is detected by the control circuit 100, the pressure increasing valve 43 and the pressure decreasing valve 49 are activated to regulate the pressure in the wheel brake 36. Also, when the locking of the rear wheels RR, RL are detected by the control circuit 100, the pressure increasing valve 55 and the pressure decreasing valve 58 are activated to regulate the pressures in the wheel brakes 33, 34. When the brake pedal 5 is released by the vehicle diver in the anti-locking operation, the check valves 53, 54 and 60, which are disposed in the return passages 51, 52 for the front wheels and the return passage 59 for the rear wheels, are opened to return the brake fluid from the wheel brakes 33, 34, 35 and 36 to the pressure generating device 1 immediately.

Figure 5:
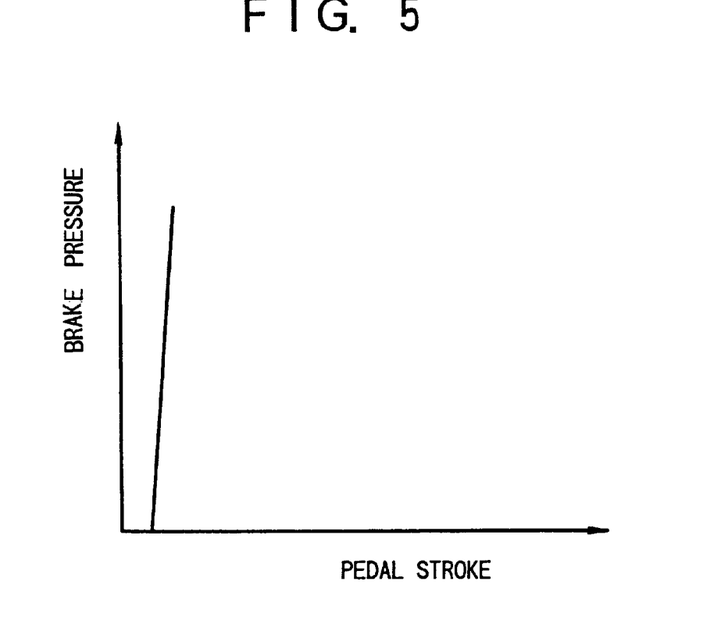
FIG. 5 is a graph showing a relationship between a front brake pressure and a stroke of a brake pedal in case of an emergency brake operation according to an embodiment of the present invention.
Figure 6:
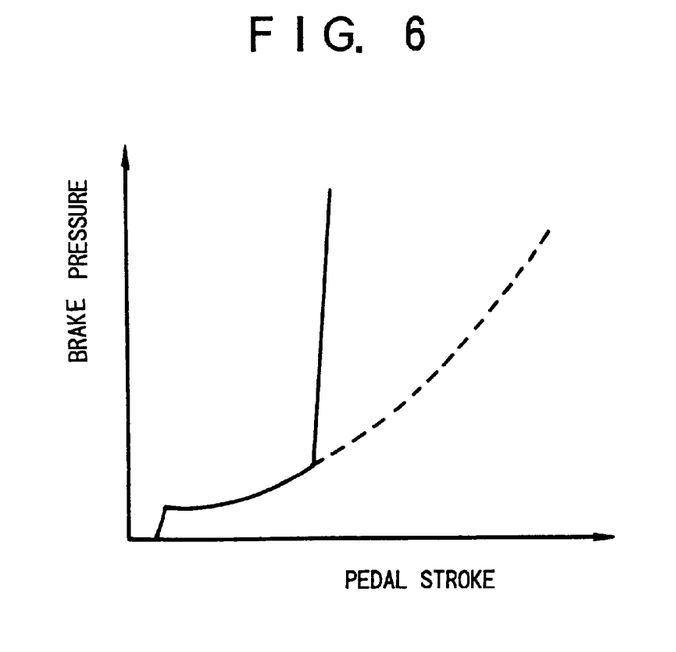
FIG. 6 is graph showing a relationship between a front brake pressure and a stroke of a brake pedal in a transitional condition from an ordinary brake operation to an emergency brake operation according to an embodiment of the present invention.

In the case where the brake pedal 5 is depressed rapidly when the vehicle driver has noticed an obstacle appeared suddenly in front of him, for example, the control circuit 100 determines that an emergency brake operation has been made, on the basis of a varying rate of the stroke of the brake pedal 5 which is detected by the stroke sensor 65 linked with the brake pedal 5. Then, the control circuit 100 activates the changeover valve 50 to be placed in its second position. Whereby, the regulator port 2a is communicated with the pressure increasing valves 42, 43 through the changeover valve 50, and the communication between the pressure increasing valves 42, 43 and the port 2c which is connected to the pressure chamber 10, is blocked. Consequently, the regulated pressure PR regulated by the spool valve 18 is supplied into the wheel brakes 35, 36 which are operatively mounted on the front wheels FR, FL, instead of the pressure PM in the pressure chamber 10. The relationship between the stroke of the brake pedal 5 and the brake pressure in the front wheel brakes 35, 36 shows a relatively rapid increase of the pressure according to the stroke of the brake pedal 5, as shown in FIG. 5. When the emergency brake operation is made while the ordinary brake operation is being made, the relationship between the stroke of the brake pedal 5 and the brake pressure in the front wheel brakes 35, 36 will be the one as indicated by a solid line in FIG. 6.

Thereafter, when the brake pedal 5 is released by the vehicle driver, and its returning operation is detected by the stroke sensor 65 or a brake switch (not shown) mounted on the brake pedal 5, the control circuit 100 activates the changeover valve 50 to be placed in the first position, again. Whereby, the pressure increasing valves 42, 43 are communicated with the pressure chamber 10 of the pressure generating device 1 through the changeover valve 50, and the communication between the pressure increasing valves 42, 43 and the regulator port 2a is blocked.

According to the above-described embodiment, the trapezoidal shaped reaction member 21 is disposed between the spool valve 18 and the elastic member 22 so as to provide the non-linear relationship between the pressure PM in the pressure chamber 10 and the regulated pressure PR. The present invention, however, is not limited to the brake system having the above-described pressure generating device 1, but may employ the system having a pressure generating device which provides a linear relationship between the pressure PM in the pressure chamber 10 and the regulated pressure PR. As described above, the stroke sensor 65 of the brake pedal 5 is employed for detecting the emergency brake operation according to the above-described embodiment. As for the device for detecting the emergency brake operation, a device using a pressure sensor (not shown) for detecting the pressure in the pressure chamber of the pressure generating device may be employed. A device using a pedal force sensor (not shown) for detecting a force depressed to the brake pedal may also be employed. Or, a device using a differential value of a vehicle speed which is calculated on the basis of the wheel speeds detected by the wheel speed sensor (not shown).

It should be apparent to one skilled in the art that the above-described embodiment are merely illustrative of but a few of the many possible specific embodiment of the present invention. Numerous and various other arrangements can be readily devised by those skilled in the art without departing from the spirit and scope of the invention as defined in the following claims.

What is claimed is:

1. A brake pressure control system for a vehicle having a brake pedal and a wheel brake operatively mounted on a wheel, comprising:

pressure generating means for generating a first brake pressure of a first pressure characteristic according to a stroke of the brake pedal, and generating a second brake pressure of a second pressure characteristic according to the stroke of the brake pedal, the pressure generating means being adapted to generate the second brake pressure to be higher than the first brake pressure, with a smaller stroke of the brake pedal than the stroke of the brake pedal for generating the first brake pressure, the pressure generating means comprising:

a cylinder body;

a pressure source connected with the cylinder body for generating a power brake pressure;

a piston slidably disposed in the cylinder body and operated by the brake pedal; and valve means disposed in the cylinder body and operatively connected with the piston for defining a first pressure chamber and a second pressure chamber in the cylinder body, the first pressure chamber generating the first brake pressure in response to depression of the brake pedal, and the second pressure chamber introducing thereinto the power brake pressure generated from the pressure source and regulating the power brake pressure in response to depression of the brake pedal to generate the second brake pressure;

detection means for detecting an emergency brake operation of the brake pedal; and pressure selecting means for selecting one of the first brake pressure and the second brake pressure to be supplied into the wheel brake, the pressure selecting means being adapted to select the second brake pressure when the detection means detects the emergency brake operation of the brake pedal.

2. A brake pressure control system for a vehicle as recited in claim 1, wherein the pressure selecting means comprises a changeover valve selectively placed in one of a first position for communicating the wheel brake with the first pressure chamber and blocking a communication between the wheel brake and the second pressure chamber, and a second position for communicating the wheel brake with the second pressure chamber and blocking the communication between the wheel brake and the first pressure chamber.

3. A brake pressure control system for a vehicle as recited in claim 2, further comprising anti-locking valve means disposed between the changeover valve and the wheel brake for increasing or decreasing the brake pressure in the wheel brake depending on a locking condition of the wheel.

4. A brake pressure control system for a vehicle as recited in claim 1, wherein a front hydraulic circuit is provided for connecting the first pressure chamber of the pressure generating means with front wheel brakes operatively mounted on front wheels of the vehicle, and a rear hydraulic circuit is provided for connecting the second pressure chamber of the pressure generating means with rear wheel brakes operatively mounted on rear wheels of the vehicle, and wherein the pressure selecting means is adapted to block the front hydraulic circuit and connect the front wheel brakes with the second pressure chamber when the detection means detects the emergency brake operation of the brake pedal.

5. A brake pressure control system for a vehicle as recited in claim 4, wherein the pressure selecting means comprises a changeover valve selectively placed in one of a first position for communicating the front wheel brakes with the first pressure chamber and blocking a communication between the front wheel brakes and the second pressure chamber, and a second position for communicating the front wheel brakes with the second pressure chamber and blocking the communication between the front wheel brakes and the first pressure chamber.

6. A brake pressure control system for a vehicle as recited in claim 5, further comprising anti-locking valve means disposed between the changeover valve and the front wheel brakes for increasing or decreasing the brake pressure in the front wheel brakes depending on locking conditions of the front wheels.

* * * * *

UNITED STATES PATENT AND TRADEMARK OFFICE
CERTIFICATE OF CORRECTION

PATENT NO. : 5,897,175
DATED : April 27, 1999
INVENTOR(S) : T. TERAZAWA, et al.

It is certified that error appears in the above-identified patent and that said Letters Patent is hereby corrected as shown below:

Title page, the following shouldbe inserted: Item

[73] Assignee: Aisin Seiki Kabushiki Kaisha, Kariya city, Aichi pref., Japan

Signed and Sealed this

Tenth Day of October, 2000

Attest:

Q. TODD DICKINSON

Attesting Officer

Director of Patents and Trademarks